United States Patent Office 3,444,250
Patented May 13, 1969

---

3,444,250
PYROLYSIS OF HEPTAALKYLBENZENONIUM FLUOBORATE TO FORM ALKYL FLUORIDES
George Suld, Springfield, Pa., assignor to Sun Oil Company, Philadelphia, Pa., a corporation of New Jersey
No Drawing. Original application Dec. 16, 1963, Ser. No. 330,593, now Patent No. 3,371,113. Divided and this application Aug. 7, 1967, Ser. No. 658,624
Int. Cl. C07c *19/08*
U.S. Cl. 260—653                 4 Claims

---

ABSTRACT OF THE DISCLOSURE

Heptaalkylbenzenonium fluoborates are prepared by contacting an alkylideneheptaalkylcyclohexadiene starting material with HF-BF$_3$, removing excess HF, and then treating the reaction product with a certain type of ether to form crystalline heptaalkylbenzonium fluoborate. Another embodiment is the same except that the suitable starting material is formed by alkylating benzene or an alkylbenzene until the benzenoid material contains a total of seven alkyl groups.

---

This is a division of application Ser. No. 330,593, filed Dec. 16, 1963, now United States Patent 3,371,113.

This invention relates in one aspect to the preparation of alkyl fluorides by the pyrolysis of heptaalkylbenzenonium fluoborates. The invention also relates to a method of preparing certain heptaalkylbenzenonium fluoborates and, in a further aspect, to heptamehtylbenzenonium fluoborate and heptaethylbenzenonium fluoborate as new compositions. These new compounds are useful in that they can be pyrolized to methyl or ethyl fluoride and also in that they are effective catalysts for the alkylation of aromatic hydrocarbons.

The new compounds heptaethylbenzenonium fluoborate and heptamethylbenzenonium fluoborate are organic salts having the formulae C$_{20}$H$_{35}$BF$_4$ and C$_{13}$H$_{21}$BF$_4$, respectively. To show the positive and negative ions of the salt the formula can be written, using heptaethylbenzenonium fluoborate as an example, as [C$_{20}$H$_{35}$]$^+$BF$_4^-$. The structure of the heptaethylbenzenonium (C$_{20}$H$_{35}^+$) ion, which is believed to be a sigma complex, can be indicated as

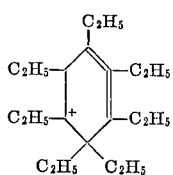

It can be visualized as being formed by the combination of hexaethylbenzene and C$_2$H$_5^+$ ion, thus (Equation 1)

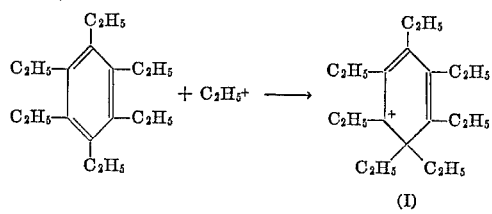

(I)

The heptaethylbenzenonium ion (I) shown in Equation 1 has two other resonance forms, II and III, as follows:

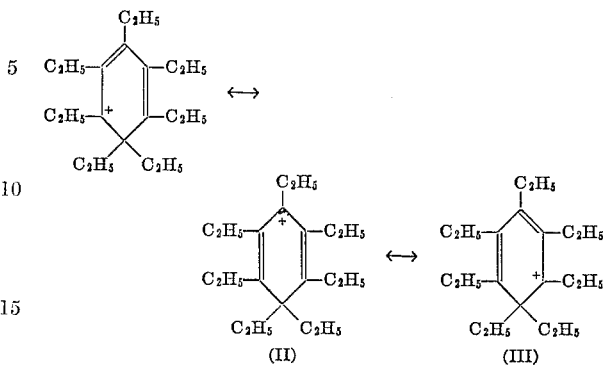

These three forms can be indicated by either of the following structures:

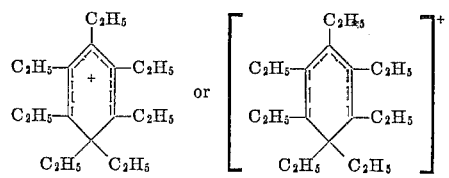

Heptamethylbenzenonium fluoborate has a structure the same as described above for the heptaethylbenzenonium fluoborate except that the ethyl groups are placed by methyl groups. The preferred new compound is heptaethylbenzenonium fluoborate.

In addition to discovering heptamethyl and heptaethylbenzenonium fluoborate we have also found a novel method of preparing these and other heptaalkylbenzenonium fluoborates, the other heptaalkylbenzenonium fluoborates being the same as heptaethylbenzenonium fluoborate described above except that one or more but not all of the seven ethyl groups is replaced by a methyl group. We have also found that the heptaalkylbenzenonium fluoborates wherein alkyl is methyl or ethyl pyrolyze to yield methyl or ethyl fluoride, i.e., an alkyl fluoride. Thus the invention embraces a process for preparing alkyl fluorides by a procedure which involves preparation of a heptaalkylbenzenonium fluoborate followed by pyrolysis of same. The invention also embraces subprocesses thereunder some of which are processes for preparing heptaalkylbenzenonium fluoborates, and another of which is the process of pyrolyzing these fluoborates. As mentioned before, the invention further embraces heptamethyl and heptaethylbenzenonium fluoborate as new compositions. The preparations of the heptaalkylbenzenonium fluoborates will be described first after which their pyrolytic conversion to alkyl fluorides will be described.

One method of preparing heptaalkylbenzenonium fluoborate involves contacting an alkylidenehexaalkylcyclohexadiene-2,5 starting material with HF and BF$_3$ after which any HF used in excess of 1 mole per mole of starting material is removed. Removal of the excess HF leaves a viscous liquid gummy residue which upon treatment with a lower alkyl ether is converted to a crystalline heptaalkylbenzenonium fluoborate salt.

The alkylideneheptaalkylcyclohexadiene - 2,5 starting materials have the following structure:

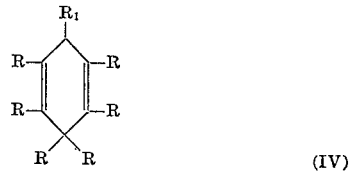

(IV)

wherein $R_1$ is methylene or ethylidene and R is methyl or ethyl. Preferably $R_1$ is ethylidene and all R's are ethyl in which case the starting material is 1-ethylidene-2,3,4,4,5,6 - hexaethylcyclohexadiene - 2,5. These starting materials can be prepared by known techniques, such as those described in U.S. Patent 2,951,879 issued Sept. 6, 1960 to Edwards et al. As described in this patent 1-methylene - 2,3,4,4,5,6 - hexamethylcyclohexadiene is prepared by a procedure which involves alkylating benzene or a methyl substituted benzene such as xylene, tetramethylbenzene, etc. with methyl chloride in the presence of a Friedel-Crafts catalyst, preferably anhydrous aluminum chloride. Preferably the starting material is a methylated benzene containing at least 3 methyl substituents. The alkylation is conducted in an inert atmosphere, at a temperature of 50°–300° F., preferably 175°–200° F., and at a pressure of 0-50 p.s.i.g., preferably atmospheric pressure. Preferably 1 mole of catalyst per mole of benzenoid starting material is employed. When consumption of methyl chloride ceases the reaction mixture is cooled to room temperature. Two phases exist, a heavier complex phase containing a complex of the catalyst and the cyclohexadiene product and a lighter oil phase. The complex phase is separated and is then hydrolyzed with ice water whereby a water insoluble hydrolysis product is formed. The hydrolysis product is recovered by extraction with ligroin after which the ligroin solution is extracted with concentrated hydrochloric acid. The acid solution is separated and any insoluble matter therein is separated and discarded. The acid phase is then neutralized which effects the precipitation of the 1-methylene-2,3,4,4,5,6-hexamethylcyclohexadiene-2,5 product.

Similarly, 1-ethylidene-2,3,4,4,5,6-hexaethylcyclohexadiene-2,5 is prepared by alkylating benzene or an ethyl substituted benzene with ethyl chloride under the conditions described above. Preferably the benzenoid starting material is an ethylated benzene containing at least three ethyl substituents. 1-ethylidene-2,3,4,4,5,6-hexaethylcyclohexadiene can also be prepared by alkylating benzene with ethylene in the presence of HF and $BF_3$ as catalyst, at an ethylene pressure of 500 p.s.i.g. and at a temperature of 25° C. The mole ratio of HF to benzene is preferably about 4:1 and the mole ratio of $BF_3$ to benzene is preferably about 1:1. The reaction is complete in 5–20 minutes. Recovery of 1-ethylidene-2,3,4,4,5,6-cyclohexadiene is effected by a procedure which involves quenching the reaction mixture in ice and separating the resulting hydrocarbon layer from the aqueous acid layer. The hydrocarbon layer contains 70–80% 1-ethylidene-2,3,4,4,5,6-hexaethylcyclohexadiene and 20–30% hexaethylbenzene. The latter can be separated by fractional crystallization at −10° to 20° C. to leave substantially pure 1-ethylidene-2,3,4,4,5,6-hexaethylcyclohexadiene-2,5.

When the starting material contains both methyl and ethyl groups, i.e., where some of the R radicals in the starting material are methyl groups and others are ethyl groups, such a starting material can be obtained by alkylating, according to the procedure described in the aforesaid patent, a methyl substituted benzene with ethyl chloride, an ethyl substituted benzene with methyl chloride, or a methylethyl benzene with either methyl chloride or ethyl chloride.

In describing the conversion of the above-described starting materials to heptaalkylbenzenonium fluoborate salts it will be assumed that the starting material is 1-ethylidene-2,3,4,4,5,6-hexaethylcyclohexadiene-2,5. This latter material is first reacted, i.e., contacted with, HF and $BF_3$. The amounts of HF and $BF_3$ used can vary considerably but the yield of the heptaalkylbenzenonium fluoborate subsequently recovered is maximized when the amounts of HF and $BF_3$ are at least one mole of each per mole of starting material. Preferably a molar excess is used, i.e., more than one mole of each per mole of starting material, e.g., 1–100 moles HF and 1–10 moles $BF_3$ per mole of starting material. Although less than equimolar amounts of HF and $BF_3$ can be employed, e.g., 0.3–1.0 mole of each per mole of starting material, the yields of the final product are reduced.

The temperature at which the contacting is effected is preferably about room temperature (25° C.) although temperatures up to about 100° C. and lower temperatures down to about −10° C. can also be employed. In most cases, however, the temperature will be in the range of 10°–60° C.

The HF should be substantially anhydrous, i.e., should contain not more than 2–3% water, preferably not more than 1%, and should be used in liquid phase. Therefore, depending upon the reaction temperature it may be necessary to carry out the contacting under superatmospheric pressure in order to maintain at least some of the HF in liquid phase.

The reaction or contacting time should normally be about 1–20 minutes. Although longer reaction times e.g., 2 hours, can be employed, no improved results are achieved thereby. In most cases a contacting time of about 3–5 minutes is sufficient.

The intermediate product which is formed by contacting 1 - ethylidene - 2,3,4,4,5,6 - hexaethylcyclohexadiene-2,5 with HF and $BF_3$ is an orange-red amorphous, or at least substantially amorphous, gummy liquid whose exact composition is unknown. It is soluble in HF; consequently when a molar excess of HF is employed, as is preferable, the reaction product mixture is a single homogeneous liquid phase. Where excess $BF_3$ is also employed most of it will also be dissolved in the excess HF.

Any excess HF used is next removed from the reaction product mixture in order to isolate the orange-red gummy intermediate. Since HF has a relatively low boiling point (19.4° C.) it can be readily removed by merely allowing it to evaporate at room or slightly higher temperature and at either about atmospheric pressure or at a reduced pressure. All boiling points stated herein are at 1 atm. pressure. Preferably the excess HF is removed by passing a stream of inert gas such as nitrogen through the vessel containing the reaction product mixture. The inert gas not only serves to sweep out the vaporized HF (and any excess $BF_3$) but it also serves to prevent contact of the reaction product mixture with air or moisture tends to reduce the amount of heptaethylbenzenonium fluorobate subsequently obtained.

Although it is not essential that any excess $BF_3$ be removed from the reaction zone prior to the next step which involves treating the orange-red intermediate with an ether, it is desirable to do so because if $BF_3$ is present during the ether treatment it reacts with the ether to form a $BF_3$ etherate. This is undesirable for several reasons. One, it results in an increased ether usage. Secondly, it is usually desired to recover excess $BF_3$ for reuse and it is generally much more convenient to recover it directly as $BF_3$ rather than as an etherate and then recovering $BF_3$ from the etherate. In any event, if the HF is removed from the reaction product mixture by evaporation this will also effect removal of the $BF_3$ since the latter boils at a much lower temperature (−101° C.) than HF (19.4°C.).

The gummy intermediate is next treated with an ether. This step, which involves mixing the orange-red intermediate with the ether, effects the conversion of the substantially amorphous intermediate to the crystalline heptaethylbenzenonium fluoborate salt. When the ether and intermediate are first contacted nothing happens. When the mixture is agitated, i.e., mixed, however, the glue-like intermediate begins to change to a crystalline solid. If mixing is continued for a relatively short period of time the only material present distinct from the ether phase is a crystalline solid which is heptaethylbenzenonium fluoborate.

It is essential that the ether be of a certain type. It must be a dialkyl ether in which the alkyl groups are methyl or ethyl. Such an ether has the formula R—O—R where R is methyl or ethyl. The only ethers within this definition are dimethylether, methylethylether, and diethylether. Of these diethylether is preferred. The ether is employed in liquid phase, hence in some cases the ether treatment step should be carried out at reduced temperature or superatmospheric pressure in order to maintain the ether in liquid phase.

The mixing time required to effect the change from the gummy intermediate to a crystalline solid depends upon a number of factors but is generally on the order of 5–30 minutes. Factors which influence the time required include the amount of agitation, temperature, amount of ether, and the like. As the amount of agitation increases, the time required decreases. As the temperature increases the time also decreases. Preferably the temperature is in the range of 10°–60° C. since within this range the conversion is usually effected within a reasonable time. If desired, however, higher temperatures up to, say, 100° C. and lower temperatures down to, say, −10° C. can also be used. Temperatures much over 100° C. should be avoided because they result in thermal decomposition of the heptaalkylbenzenonium fluoborate salt. As mentioned previously, for whatever temperature is employed the pressure in the ether treatment step should be sufficient to maintain the ether in liquid phase. As the amount of the ether employed is increased the time for the conversion of the intermediate to a crystalline solid decreases. Normally the amount of ether used will be in the range of 1–100 ml. per gram of intermediate, although preferably the amount used is 5–50 mls. per gm. In carrying out the ether treatment it is sufficient to add the entire quantity of the ether to the intermediate and stir until the intermediate changes to a crystalline solid. Alternatively, a portion of the ether can be mixed with the intermediate for several minutes after which crystalline solid and remaining intermediate are allowed to settle and the ether is decanted. This procedure is repeated until all of the intermediate is converted to crystalline solid.

As described above, only certain ethers are suitable for the present purpose. The reason why other ethers are not satisfactory is not known with certainty but such has nevertheless been found to be the case. For example, when other ethers such as diisopropyl ether, tetrahydrofuran, etc. or other solvents such as benzene, toluene, pentane, hexane, etc. are used either of two undesirable results occurs. In some cases, e.g., with pentane, the gummy intermediate changes to a solid gum similar to used chewing gum. In other cases, e.g., with tetrahydrofuran, the intermediate dissolves therein and if the resulting solution is cooled to 0° C., no product of any type crystallizes.

The mechanism by which this ether treatment step results in the conversion of the gummy intermediate to crystallize heptaethylbenzenonium fluorborate is not known with certainty. It may be that there is a chemical reaction involved. On the other hand, it may be that the ether selectively dissolves by-products, etc. present in the intermediate product. It is believed, however, that some chemical reaction is involved because of the fact that only certain ethers are effective in converting the intermediate to the crystalline solid. If the function of the ether were only to selectively dissolve by-products, etc. then tetrahydrofuran and diisopropyl ether should be suitable as well as diethyl ether because the solvent properties of these ethers are not greatly different. As already mentioned, however, tetrahydrofuran and diisopropyl ether are definitely not equivalent to diethyl ether for the present purpose. The conclusion, therefore, is that there is more involved in the ether treatment step than a selective dissolution. Regardless of the mechanism involved the result of the ether treating step is referred to herein as the conversion of the gummy intermediate to solid crystalline heptaethylbenzenonium fluoborate.

Completion of the ether treatment results in a slurry of crystalline, heptaethylbenzenonium fluoborate in ether.

The fluoborate salt can be separated in any convenient manner such as by filtration, etc.

The following example illustrates the preparation of heptaalkylbenzenonium fluoborate from alkylidenehexaalkylcyclohexadiene-2,5, the embodiment of the invention just described.

Example I

Into an 80 ml. shaking type bomb are charged 0.037 mole of 1-ethylidene-2,3,4,4,5,6-cyclohexadiene-2,5, 1 mole anhydrous HF, and 0.04 mole $BF_3$. The bomb is at room temperature. The bomb is shaken for 3.5 minutes after which the contents of the bomb are transferred to a polyethylene container which has been previously flushed with nitrogen. Nitrogen is passed through the container and the excess HF is allowed to evaporate. The small amount of excess $BF_3$ evaporates along with the excess HF. Upon evaporation of all the excess HF an orange-red gummy residue weighing about 10 gms. remains. Next 50 mls. diethyl ether is added to the container and the mixture is shaken on a mechanical shaker for about 30 minutes. At the end of this time a yellow finely divided crystalline solid is present and it is separated from the remaining ether phase. None of the orange-red intermediate is present at the end of the 30-minute period. The yellow crystalline solid is washed twice with 50 ml. portions of diethyl ether and is dried under nitrogen. The weight of the dried solid is 8.6 gms. By elemental, nuclear magnetic resonance, ultraviolet and infrared analyses the product is identified as heptaethylbenzenonium fluoborate having a structure as follows:

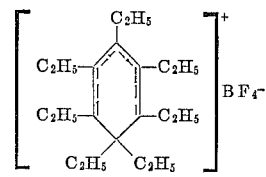

The yield of product is 65% based upon the cyclohexadiene starting material. In general the yield of the heptaalkylbenzenonium fluoborate salt obtained from the cyclohexadiene starting material by the process described herein is in the range of 60–90%. The salt is yellow in color and becomes gummy upon prolonged exposure to the atmosphere. When stored under nitrogen or other inert gas at 0° C. it is stable for at least 3 months.

When other starting materials of the type specified by Formula IV are employed analogous results are obtained, i.e., a heptaalkylbenzenonium fluoborate salt is obtained as product, the specific alkyl groups in the fluoborate salt depending upon the alkyl groups in the cyclohexadiene starting material.

Example II

The procedure is the same as in Example I except that the ether employed is tetrahydrofuran instead of diethyl ether. The orange-red residue dissolves entirely and upon cooling the resulting ether solution to 0° C. no product crystallizes.

Example III

The procedure is the same as in Example I except that pentane is used instead of diethyl ether. The orange-red residue is converted entirely to a solid gum. No crystalline solid is obtained.

Another method of preparing heptaalkylbenzenonium fluoborate according to the invention involves alkylating benzene or an alkyl substituted benzene wherein alkyl is methyl or ethyl with ethylene, methyl chloride or ethyl chloride. The alkylation is carried out in the presence of at least 1 mole of HF and at least 1 mole of $BF_3$ per mole of benzenoid starting material. The alkylation is continued until a substantial portion of the benzenoid starting material contains seven alkyl groups. After the alkylation is complete any excess HF, i.e., any HF in excess of 1 mole per mole of benzenoid starting material, is removed and a gummy residue remains. This gummy residue is treated with an ether in the manner previously described to obtain crystalline heptaalkylbenzenonium fluoborate. Thus the major difference between this method and the method already described involving a cyclohexadiene starting material is the procedure prior to the formation of the gummy intermediate.

The starting material is benzene or alkyl substituted benzenes. Any alkylbenzene can be used so long as the alkyl groups are either methyl or ethyl. The number of alkyl groups is not critical and can range from one to six. Examples of suitable starting materials include benzene, toluene, ethylbenzene, diethylbenzene, hexamethylbenzene, methylethylbenzene, trimethylethylbenzene, dimethyltriethylbenzene, etc. Such materials can be prepared by known methods.

Regardless of the specific starting material or the specific alkylating agent employed, the alkylation catalyst and the amount thereof are the same. The catalyst is HF and $BF_3$, and at least 1 mole of HF and at least 1 mole of $BF_3$ should be employed per mole of the benzenoid starting material. Preferably the amount of HF is 1–100 moles and the amount of $BF_3$ is 1–10 moles, each being per mole of benzenoid starting material. In other words a molar excess of both HF and $BF_3$ is preferred. In addition, the HF should be substantially anhydrous and should be employed in liquid phase.

It is recognized that since at least some of the HF and $BF_3$ are contained in the heptaalkylbenzenonium fluoborate product, the HF and $BF_3$ are reactants, as well as a catalyst. On the other hand the specified alkylation will not occur in the absence of a catalytic material, which for the present purpose must be $HF$-$BF_3$. In this sense then the HF and $BF_3$ are properly referred to as a catalyst.

The alkylation conditions depend upon the specific alkylating agent employed. In the case of ethylene, alkylation is effected by contacting the starting material with ethylene in the presence of the catalyst at a temperature of about 10°–100° C. and an ethylene pressure of about 100–5000 p.s.i.g. Preferably the temperature is 20°–60° C. and the ethylene pressure is 300–1000 p.s.i.g., although other temperatures and pressures within the ranges specified can also be employed. Regardless of the alkylating agent employed the alkylation should be carried out in a manner to exclude air and moisture.

Where methyl or ethyl chloride is the alkylating agent the alkylation can be effected at a temperature of about 10°–100° C. and a methyl or ethyl chloride pressure of about 0–5000 p.s.i.g. Preferably the temperature is 50°–100° C. and the pressure is 0–100 p.s.i.g.

The alkylation should be carried out until a substantial portion of the starting material contains seven alkyl groups, including, of course, any alkyl substituents on the starting material. This can be accomplished by continuing the alkylation until consumption of alkylating agent stops or, in the case of the alkyl halide alkylating agents, until production of HCl stops. When no further consumption of alkylating agent occurs most of the benzenoid starting material contains seven alkyl groups. Occasionally a minor amount, less than 50% by weight, of the starting material contains less than seven alkyl groups when consumption of alkylating agent ceases but this does not detract from the operability of the process. In most cases essentially all of the starting material contains seven alkyl groups when consumption of alkylating agent stops. Another method of defining the alkylation step is that the starting material is alklated until a substantial portion thereof has reacted with $7-\eta$ moles of alkylating agent per mole of starting material where $\eta$=the number of alkyl substituents on the starting material. For example, benzene is alkylated until a substantial portion thereof has reacted with 7 moles alkylating agent per mole of benzene. Similarly, tetramethylbenzene is alkylated until a substantial portion thereof has reacted with 3 (7 minus 4) moles of alkylating agent.

The time required for the alkylation, i.e., the time required for the conversion of the starting material to a starting material containing seven alkyl groups, varies somewhat depending upon the alkylating agent employed. For ethylene the time is about 5 minutes to 2 hours, with a reaction time of 10–60 minutes being sufficient in most cases. When the alkylating agent is an alkyl chloride the reaction time is about 10 minutes to 4 hours, with a reaction time of 30–120 minutes being sufficient in most cases. In either case the reaction time varies with the conditions of temperature and pressure employed, minimum reaction time being obtained when the temperature and pressure are within the preferred ranges specified previously.

When the alkylation is complete the subsequent procedure is the same as described previously for the process involving the use of the cyclohexadiene starting material. Thus any HF used in excess of 1 mole per mole of benzenoid starting material is removed, preferably by evaporation in a stream of inert gas such as nitrogen. Evaporation of the HF will also result in the removal of any excess $BF_3$ and any ethylene or alkyl halide which may be present in the reaction zone. Evaporation of the HF leaves a gummy residue which upon treatment with an ether in the manner previously described yields crystalline heptaalkylbenzenonium fluoborate. As in the case of the cyclohexadiene starting material failure to use an ether of the type specified results in failure to obtain crystalline heptaalkylbenzenonium fluoborate.

The following example illustrates the preparation of heptaethylbenzenonium fluoborate utilizing benzene as the starting material.

Example IV

To a shaking type bomb at room temperature are charged 0.26 mole benzene, 1.0 mole anhydrous HF and 0.45 mole $BF_3$. The bomb is shaken mechanically and ethylene is charged thereto until the ethylene pressure is about 500 p.s.i.g. As the pressure drops due to ethylene consumption additional ethylene is charged to the bomb to maintain the ethylene pressure at about 500 p.s.i.g. After 20 minutes shaking ethylene consumption ceases. The contents of the bomb are then transferred to a polyethylene container which has been previously flushed with nitrogen. Excess HF is evaporated in a stream of nitrogen as in Example I. An orange-red, gummy residue remains and is treated with diethyl ether as in Example I. The results of the ether treatment are the same as in Example I, i.e., a yellow crystalline solid is obtained. By the same analytical techniques used in Example I the solid is identified as heptaethylbenzenonium fluoborate.

Analogous results are obtained when other benzenoid starting materials of the type specified are employed with either ethylene or the specified alkyl chloride alklating agents. Analogous results are also obtained when benzene is employed as starting material and ethyl or methyl chloride is the alkylating agent.

It was mentioned previously that the heptaalkylbenzenonium fluoborates are useful as alkylation catalysts. This is illustrated more specifically by the following example.

Example V

Into a stainless steel bomb is charged 0.25 mole biphenyl and 0.01 mole heptaethylbenzonium fluoborate. The bomb is heated to 80° C. and ethylene is then charged to the bomb until the ethylene pressure is 500 p.s.i.g. The bomb temperature rises to 150° C. over the next 40 minutes and is then maintained at 150° C. for a period of 5 hours. The ethylene pressure is maintained at 450–520 p.s.i.g. throughout the entire run. At the end of the 5-hour period the bomb is opened and its contents are quenched in ice water. Two layers form, an upper hydrocarbon layer and a lower acid layer. The upper layer is decanted and found to weigh 46.7 grams. It analyzes as follows (all percentages are by weight):

| | Percent |
|---|---|
| Biphenyl | 30.0 |
| Mono-ethylbiphenyl | 30.5 |
| Di-ethylbiphenyl | 19.8 |
| Tri-ethylbiphenyl | 9.5 |
| Tetra-ethylbiphenyl | 4.0 |
| Penta-ethylbiphenyl | 1.7 |
| Hexaethylbenzene | 4.5 |
| | 100.0 |

It is apparent from the above data that substantial alkylation has occurred. When no catalyst is employed essentially no alkylation occurs.

According to another embodiment of the invention alkyl fluorides wherein alkyl is methyl or ethyl are prepared by pyrolyzing a heptaalkylbenzenonium fluoborate wherein alkyl is methyl or ethyl. If the alkyl groups in the fluoborate salt are all ethyl the salt is heptaethylbenzenonium fluoborate and ethyl fluoride is obtained upon pyrolysis. If the salt is heptamethylbenzonium fluoborate methyl fluoride is obtained upon pyrolysis. If the salt contains both methyl and ethyl groups pyrolysis results in both methyl fluoride and ethyl fluoride.

The temperature required to effect the thermal decomposition, i.e., pyrolysis, of the specified fluoborate salts is about 100° to 130° C. Slow decomposition occurs at about 100° C.; at higher temperatures the rate of decomposition increases and is extremely rapid at 130° C. Consequently the temperature employed should be at least 100° C. and should be sufficient to pyrolyze the heptaalkylbenzenonium fluoborate. Preferably the pyrolysis temperature does not exceed 200° C., more preferably 150° C.

In addition to the alkyl fluoride, $BF_3$ is also produced by the pyrolysis of heptaalkylbenzenonium fluoborates. The $BF_3$ and alkyl fluoride can be recovered as a mixture or can be recovered separately by any method desired. Fractional condensation is usually the most convenient method of separation since there is a relatively wide spread between the boiling points of $BF_3$ (−101° C.), $CH_3F$ (−78° C.), and $C_2H_5F$ (−38° C.).

The heptaalkylbenzenonium fluoroate to be pyrolyzed can be, of course, and preferably is prepared by either of the methods described hereinbefore.

Example VI

A sample of the heptaethylbenzenonium fluoborate prepared in Example I is placed in a vessel equipped with heating means and connected to a condenser maintained at about −50° C. by means of an acetone-Dry Ice mixture. The fluoborate salt is heated to 120° C. whereupon it decomposes with a copious gas evolution leaving a residue of hexaethylbenzene. A mixture of ethyl fluoride and $BF_3$ enters the condenser. The $BF_3$ passes through the condenser while the ethyl fluoride is condensed and collected as a liquid.

The invention claimed is:

1. Method of preparing alkyl fluoride which comprises pyrolyzing heptaalkylbenzenonium fluoborate having alkyl groups selected from the group consisting of methyl and ethyl, said pyrolyzing being at a temperature less than 200° C.

2. Method according to claim 1 wherein the material pyrolyzed is heptaethylbenzenonium fluoborate.

3. Method according to claim 1 wherein the material pyrolyzed is heptamethylbenzenonium fluoborate.

4. Method according to claim 1 wherein the pyrolysis temperature is 100° C.–200° C.

References Cited

Olah et al., J. Am. Chem. Soc. 80, 6535–6539 (1958).
Olah et al., J. Am. Chem. Soc. 80, 6540–6541 (1958).
Olah et al., J. Am. Chem. Soc. 80, 6541–6545 (1958).

DANIEL D. HORWITZ, *Primary Examiner.*